(12) United States Patent
Imai et al.

(10) Patent No.: US 9,871,361 B2
(45) Date of Patent: Jan. 16, 2018

(54) BUSBAR HOLDING STRUCTURE

(71) Applicant: YAZAKI CORPORATION, Tokyo (JP)

(72) Inventors: Masaru Imai, Shizuoka (JP); Yasutaka Miyazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/345,186

(22) Filed: Nov. 7, 2016

(65) Prior Publication Data
US 2017/0149225 A1    May 25, 2017

(30) Foreign Application Priority Data
Nov. 20, 2015 (JP) ................. 2015-228035

(51) Int. Cl.
*H02G 5/00* (2006.01)
*H02G 5/02* (2006.01)
*H01M 2/20* (2006.01)

(52) U.S. Cl.
CPC ............ *H02G 5/025* (2013.01); *H01M 2/206* (2013.01); *H01M 2220/20* (2013.01)

(58) Field of Classification Search
CPC . H02G 5/025; H02G 5/00; H02G 5/02; H01B 1/21; H01B 1/20; H01B 1/00; H01B 1/22; H05K 2201/10272; H05K 2203/167; H05K 5/00; H05K 5/025; H01R 13/53; H01R 25/16; H01M 2/206; H01M 2220/20
USPC ... 174/72 B, 71 B, 88 B, 70 B, 99 B, 129 B, 174/133 B, 149 B, 68.2; 361/600, 601, 361/624, 627, 637, 639, 648, 675, 611, 361/699.2, 34; 439/76.2, 949, 55, 66, 439/114
See application file for complete search history.

(56) References Cited

U.S. PATENT DOCUMENTS

| | | | |
|---|---|---|---|
| 6,948,982 B2* | 9/2005 | Higuchi | H01H 85/2045 174/50 |
| 7,285,724 B2* | 10/2007 | Buettner | H02G 5/025 174/68.2 |
| 7,361,841 B1* | 4/2008 | Smolen | H01R 4/70 174/135 |
| 7,799,991 B1* | 9/2010 | Advey | H01R 13/424 174/50 |
| 8,829,346 B2* | 9/2014 | Robinson | H02B 1/056 174/68.2 |

FOREIGN PATENT DOCUMENTS

JP    2004-31049 A    1/2004

* cited by examiner

*Primary Examiner* — Angel R Estrada
(74) *Attorney, Agent, or Firm* — Kenealy Vaidya LLP

(57) ABSTRACT

A busbar holding structure holds at least one of plural busbars to a wires routing body. The plural busbars electrically connect plural cell batteries constituting a battery assembly. The busbar holding structure includes a bottom wall, a partition wall erected from a portion of a peripheral edge of the bottom wall, a lock portion provided on the partition wall and configured to lock a side end portion of the busbar on the wires routing body, and a first projection that projects perpendicularly from the bottom wall and is to be fitted in a through-hole provided in the busbar. A fitting gap between the first projection and the through-hole is set so as to restrict an inclination angle of the busbar with respect to the first projection and to thereby prevent the busbar from being unlocked from the lock portion.

4 Claims, 5 Drawing Sheets

BUSBAR HOLDING STRUCTURE

CROSS REFERENCE TO RELATED APPLICATIONS

This application is based on Japanese Patent Application (No. 2015-228035) filed on Nov. 20, 2015, the contents of which are incorporated herein by reference.

BACKGROUND OF THE INVENTION

1. Field of the Invention

The present invention relates to a busbar holding structure.

2. Description of the Related Art

In vehicular battery packs that are connected to a power conversion device for driving a motor in such vehicles as hybrid vehicles and electric vehicles, a battery module is constructed in such a manner that a number of battery cells are oriented in opposite directions alternately and arranged side by side and placed on each other so that each of their positive terminals is adjacent to two negative terminals. Plural battery cells are connected to each other in series or in parallel by connecting the adjoining opposite-polarity electrode terminals of adjoining battery cells by a connection member such as a busbar.

To assemble a battery module having the above configuration, it is necessary to connect adjoining electrode terminals by a busbar at plural locations. To this end, a busbar module is used in which busbars are housed in busbars housing units (the number of which is determined according to that of electrode terminals to be connected to each other) of a wires routing body made of an insulative resin.

A busbar module is proposed which includes plural busbars fixing units (busbars housing units) capable of fixedly housing plural respective busbars while securing positioning etc. of the busbars (refer to JP-A-2004-31049, for example). As shown in FIG. 5A, this conventional busbar module is includes plural busbars fixing units 502 which fixedly house plural respective busbars 501.

As shown in FIG. 5B, each busbar 501 is formed so as to be able to connect adjoining batteries in series when fixedly housed in a busbar fixing unit 502. The busbar 501 has a pair of battery connection holes 503 which are circular throughholes. The pair of battery connection holes 503 are portions through each of which a stud-bolt-shaped electrode is to be inserted. Portions around the battery connection holes 503 are to be sandwiched between the nuts and battery electrode top surface, respectively.

As shown in FIG. 5C, the busbar fixing unit 502 has a bottom wall 507 having a rectangular outline and a frame-shaped side wall 508 which is continuous with the peripheral edge of the bottom wall 507. The bottom wall 507 is formed with a pair of openings 509 and a central receiving portion 510. The pair of openings 509 are portions corresponding to the respective battery electrode top surfaces. The central receiving portion 510 is located between the pair of openings 509 and shaped like a bridge so as to be able to receive a central portion of the busbar 501.

The side wall 508 is composed of a pair of longer side walls 513 which are parallel with the busbar longitudinal direction and a pair of shorter side walls 514 which are perpendicular to the busbar longitudinal direction, and is formed so as to conform to the outline of the busbar 501. Each of the pair of longer side walls 513 is formed with a pair of nail-shaped busbar lock projections 515 which project inward to a small extent. The pair of busbar lock projections 515 is formed at the same position as the central receiving portion 510 in the busbar longitudinal direction so as to be spaced from the central receiving portion 510 in the wall height direction by the thickness of the busbar 501.

To fixedly house the busbar 501 in the busbar fixing unit 502, the busbar 501 is pushed into the inside space of the side wall 508 of the busbar fixing unit 502 and fixed so as to be sandwiched between the central receiving portion 510 and the two pairs of busbar lock projections 515. Peripheral portions of the busbar 501 are received by the bottom wall 507 and the busbar 501 is surrounded by the side wall 508, whereby the busbar 501 is held fixedly without play.

Incidentally, the busbar 501 carries current in a state that its portions around the pair of battery connection holes 503 are sandwiched between nuts and the battery electrode top surfaces, respectively. Thus, the busbar fixing unit 502 is configured so that the battery electrode top surfaces are inserted in the respective openings 509 of the bottom wall 507. Furthermore, in the busbar fixing unit 502, the bottom wall 507 receives the peripheral portions of the busbar 501 and the side wall 508 surrounds the busbar 501, whereby the busbar 501 is held fixedly without play.

As a result, the sizes of the busbar 501 and the busbar fixing unit 502 are large and hence the above conventional busbar module tends to suffer a high manufacturing cost and a heavy weight.

Furthermore, when the busbar 501 is fixedly housed in the busbar fixing unit 502, the busbar 501 needs to be pushed into the inside space of the side wall 508 while the two pairs of busbar lock projections 515 which are provided in the pair of longer side walls 513 are deformed outward elastically. This requires strong force for inserting the busbar 501, resulting in low work efficiency.

SUMMARY OF THE INVENTION

The present invention has been made in view of the above circumstances, and an object of the invention is therefore to provide a busbar holding structure capable of removing useless portions while ensuring busbar positioning etc. and thereby reducing the size, weight, and manufacturing cost of a busbar module.

The above object of the invention is attained by the following configurations.

(1) There is provided a busbar holding structure for holding, to a wires routing body made of an insulative resin, at least one busbar of plural busbars for electrically connecting plural cell batteries constituting a battery assembly to each other, the busbar holding structure comprising:

a bottom wall on which the at least one busbar is to be mounted;

a partition wall erected from a portion of a peripheral edge of the bottom wall;

a lock portion provided on the partition wall and configured to lock a side end portion of the at least one busbar on the wires routing body; and a first projection that projects perpendicularly from the bottom wall and is to be fitted in a through-hole provided in the at least one busbar, wherein a fitting gap between the first projection and the through-hole is set so as to restrict an inclination angle of the at least one busbar with respect to the first projection and to thereby prevent the at least one busbar from being unlocked from the lock portion.

In the busbar holding structure having the configuration of item (1), the busbar can be held reliably by the wires routing body merely by setting, properly, the fitting gap between the first projection which projects perpendicularly from the bottom wall and the through-hole formed through the busbar and the height of the lock portion with respect to the bottom wall.

As a result, the wires routing body does not require any circumferential wall that surrounds each busbar and hence can be miniaturized, which enables reduction in cost and weight. Furthermore, since there exists only one lock portion which produces insertion resistance when the busbar is inserted until coming into contact with the bottom wall, the force that is necessary to insert each busbar can be reduced.

(2) The busbar holding structure according to item (1), further includes a second projection that projects perpendicularly from the bottom wall and is to be fitted in an engagement portion provided in the at least one busbar.

According to the busbar holding structure having the configuration of item (2), rotation of the busbar about the first projection is restricted by the first projection and the second projection which project perpendicularly from the bottom wall, whereby the busbar is positioned reliably.

As a result, when each busbar is welded to the electrode terminals of the associated cell battery, there does not occur an event that undesirable rotation of the busbar obstructs connection work. For example, when each busbar is welded to the electrode terminals of the associated cell battery by ultrasonic welding, an event can be prevented that the busbar is rotated due to vibration of a horn and a sufficient amount of ultrasonic wave vibration energy does not reach welding portions. In another case that each busbar carries current in a state that it is sandwiched between nuts and battery electrode top surfaces, an event can likewise be prevented that the busbar is rotated together with each nut due to rotational torque that is produced when the nut is screwed to the electrode and sufficient fastening force cannot be obtained.

(3) In the busbar holding structure according to item (2), the through-hole is formed at a center portion of the at least one busbar, the engagement portion and another engagement portion are provided at edge portions of the at least one busbar, and the engagement portion and the another engagement portion are arranged so as to be symmetrical with respect to the through-hole.

In the busbar holding structure having the configuration of item (3), when the first projection is inserted into the through-hole of the busbar, one of the engagement portions can engage with the second projection. As a result, in letting each busbar held by the wires routing body, the attachment direction of the busbar is not restricted and the efficiency of attachment work is thereby increased.

The busbar holding structure according to the invention can remove useless portions while ensuring busbar positioning etc. and thereby reduce the size, weight, and manufacturing cost of a busbar module.

The invention has been described above concisely. The details of the invention will become more apparent when the modes for carrying out the invention (hereinafter referred to as an embodiment) described below are read through with reference to the accompanying drawings.

DETAILED DESCRIPTION OF THE EXEMPLARY EMBODIMENTS

A busbar holding structure according to an embodiment of the present invention will be hereinafter described with reference to the drawings.

Figure 1:
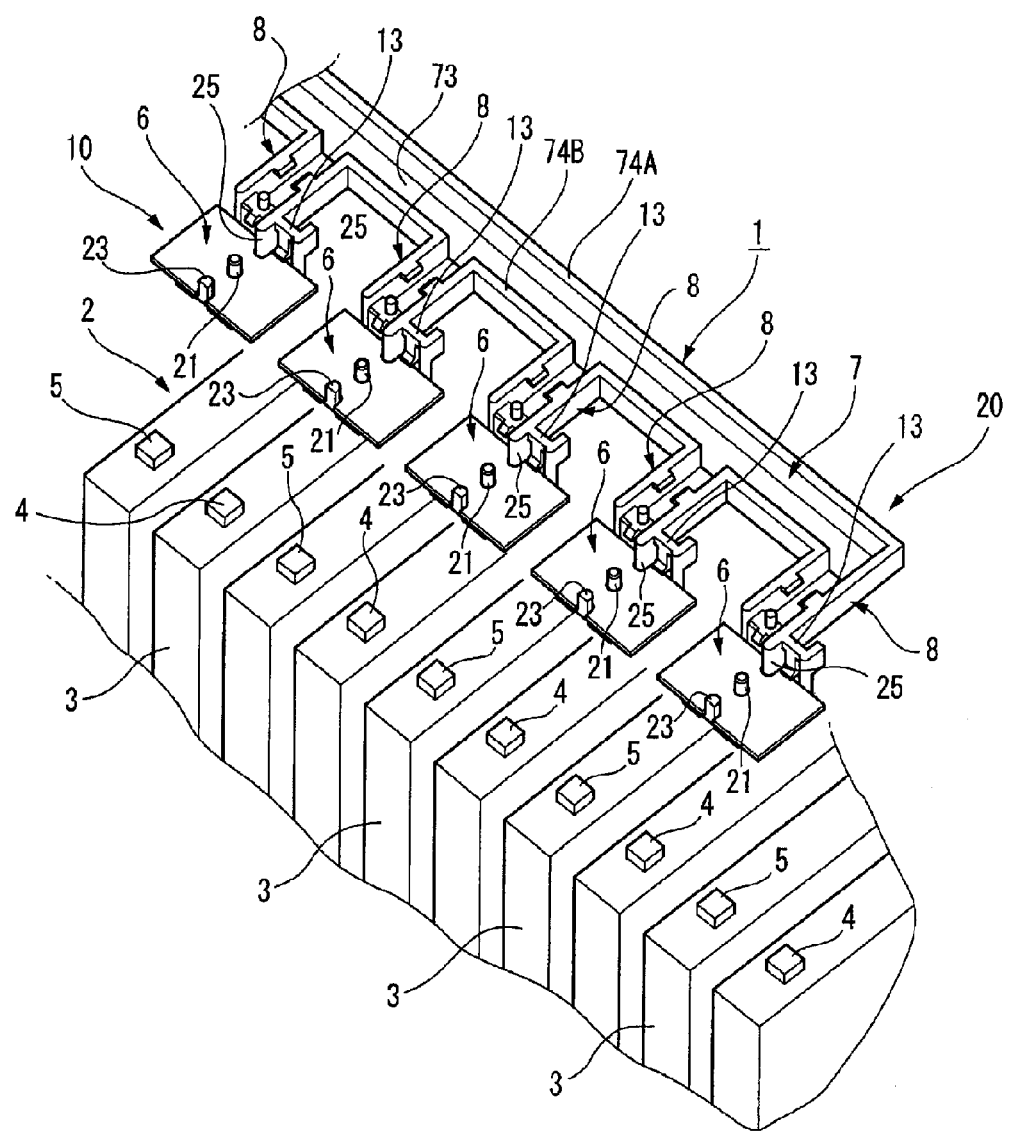
FIG. 1 is a perspective view of part of a busbar module having busbar holding structures according to an embodiment of the present invention in a state immediately before attachment of the busbar module to a battery assembly.

As shown in FIG. 1, a busbar module 1 having the busbar holding structures according to the embodiment is attached to a battery assembly 2 composed of plural cell batteries 3 and serves to supply power from the battery assembly 2 to an electric motor of an electric vehicle that runs using it or a hybrid vehicle that runs using an engine and the electric motor.

Figure 2:
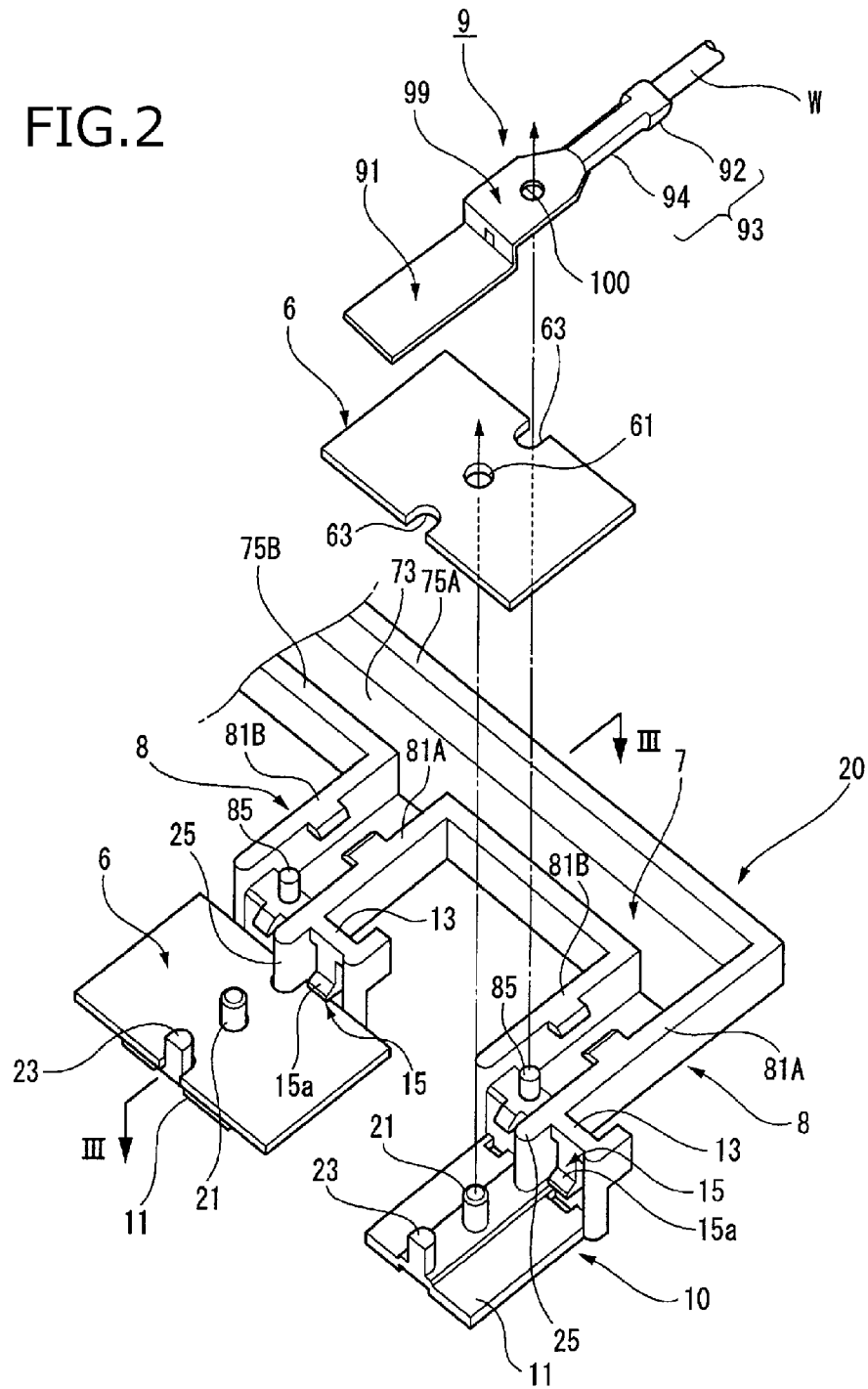
FIG. 2 is an enlarged exploded perspective view of an essential part of the busbar module shown in FIG. 1.

As shown in FIGS. 1 and 2, the busbar module 1 according to the embodiment of the invention includes plural busbars 6 which electrically connect the cell batteries 3 of the battery assembly 2 to each other, voltage detection wires (electric wires) W which are connected to voltage detection terminals 9 which are welded to the surfaces of the busbars 6, respectively, and a wires routing body 20 made of an insulative resin.

The battery assembly 2 has the plural cell batteries 3 and a member (not shown) for fixing them while placing them on each other. Each cell battery 3 has a rectangular-parallelepiped-shaped battery main body and a positive terminal 4 and a negative terminal 5 which are electrode terminals projecting from the top surface of the battery main body at positions near the two respective ends. Each of the positive terminal 4 and the negative terminal 5 is made of a conductive metal and formed so as to have a rectangular top surface. The battery assembly 2 is constructed in such a manner that the cell batteries 3 are oriented in opposite directions alternately and placed on each other so that each positive terminal 4 is adjacent to two negative terminals 5. In the battery assembly 2, each adjoining set of a positive terminal 4 and a negative terminal 5 are connected by a busbar 6 to form a series connection circuit of the associated cell batteries 3. A high DC voltage is obtained in this manner.

As show in FIG. 2, in each busbar 6 used in the embodiment which is formed by, for example, pressing a conductive metal plate, opposite longer edges are formed with a pair of engagement portions 63 that are line-symmetrical with each other with respect to a straight line passing through a through-hole 61 that is formed at the center of a rectangular plate. The through-hole 61 is circular and the engagement portions 63 are semicircular cuts. The through-hole 61 of the busbar 6 is to be fitted with a first projection 21 of a busbar holding unit 10 (described later) and the engagement portions 63 of the busbar 6 are to be fitted with a second projection 23 and a third projection 25 of the busbar holding unit 10, respectively.

Each busbar 6 is fixed to the associated cell batteries 3 by welding its two respective end portions in the longitudinal direction to the positive terminal 4 and negative terminal 5 of the cell batteries 3. Naturally, where each busbar used in the invention is fixed to the associated cell batteries 3 by screwing nuts to the positive and negative terminals of the cell batteries, a pair of terminal holes are formed through the busbar.

The wires routing body 20 used in the embodiment has plural busbar holding units 10 which are arranged in the cell batteries arrangement direction and hold respective busbars 6, a wires routing portion 7 which houses the plural voltage detection wires W in such a manner that they extend in the cell batteries arrangement direction, and plural link portions 8 which link the busbar holding units 10 to the wires routing portion 7. The wires routing body 20 is molded as an integral component using an insulative resin in such a manner that the busbar holding units 10 are provided at the tips of the link portions 8 which are arranged at regular intervals like comb teeth in the longitudinal direction of the wires routing portion 7.

The busbars 6 are held by the respective busbar holding units 10 of the wires routing body 20. Each busbar holding unit 10 is composed of a rectangular-plate-like bottom wall 11 which supports a central portion, in the longitudinal direction, of the associated busbar 6, a partition wall 13 which is erected from a portion (one edge) of the peripheral edge of the bottom wall 11, a lock portion 15 which is provided in the partition wall 13, a cylindrical first projection 21 which projects perpendicularly from the bottom wall 11, and a second projection 23 and a third projection 25 which project perpendicularly from the bottom wall 11 so as to be line-symmetrical with each other with respect to a straight line passing through the first projection 21. As such, each busbar holding unit 10 constitutes a busbar holding structure.

Whereas the bottom end of the partition wall 13 is continuous with the one edge of the bottom wall 11, its upper portion is continuous with the tip of the associated link portion 8. A positioning pin 85 to be fit into a positioning hole 100 of the associated voltage detection terminal 9 (described later) projects from the top surface of the partition wall 13.

The lock portion 15, which is provided in the partition wall 13 to lock one side end portion of the associated busbar 6 with the wires routing body 20, is a lock lance that is formed with, at the tip, a nail-shaped busbar lock projection 15a which projects to a small extent to the side of the bottom wall 11. The lock portion 15 is disposed so as to be suitable for the position of the bottom wall 11, and is formed with the busbar lock projection 15a at a position that is spaced from the bottom wall 11 in its height direction by the thickness of the busbar 6. That is, as shown in FIG. 3B, a height dimension h is set for the busbar lock projection 15a with respect to the bottom wall 11.

Figure 3A:
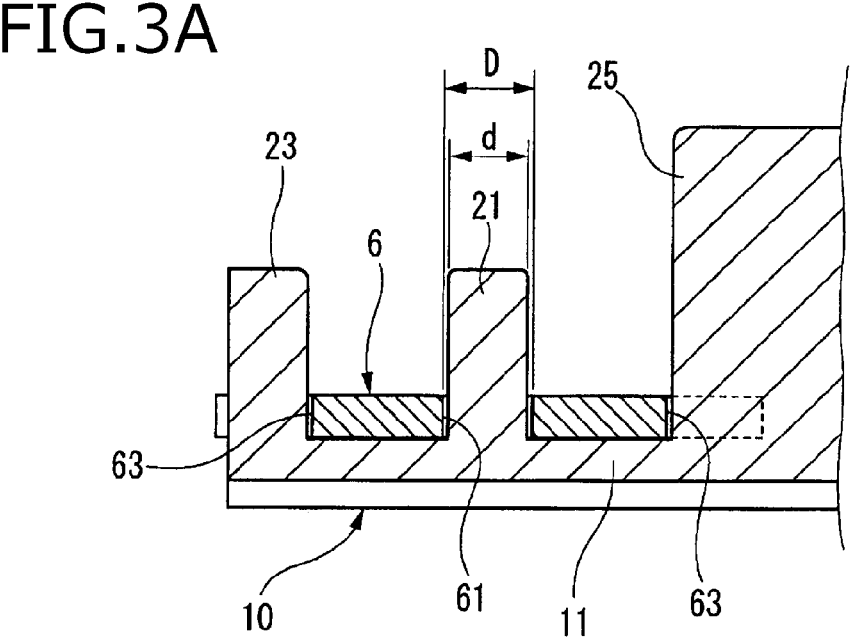
FIGS. 3A and 3B are sectional views of an essential part of one busbar holding structure of the busbar module shown in FIG. 1.

As shown in FIG. 3A, the first projection 21 which projects perpendicularly from the bottom wall 11 is a cylinder having an outer diameter d and is fitted into the through-hole 61 of the associated busbar 6. The through-hole 61 of the busbar 6 is a circular opening having an inner diameter D.

Figure 3B:
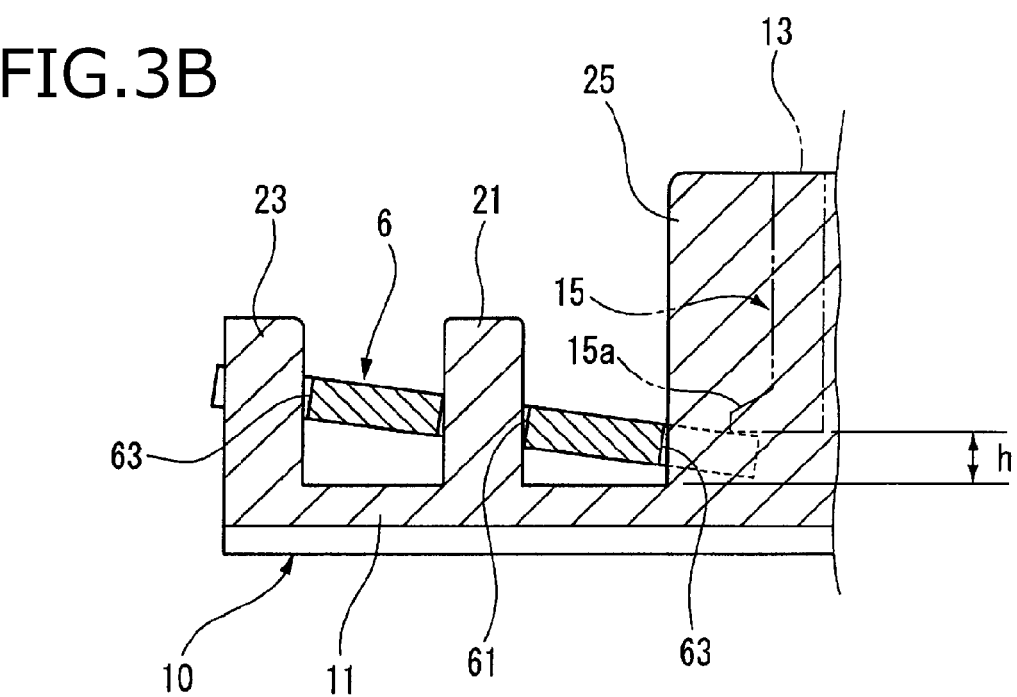
Figure 4:
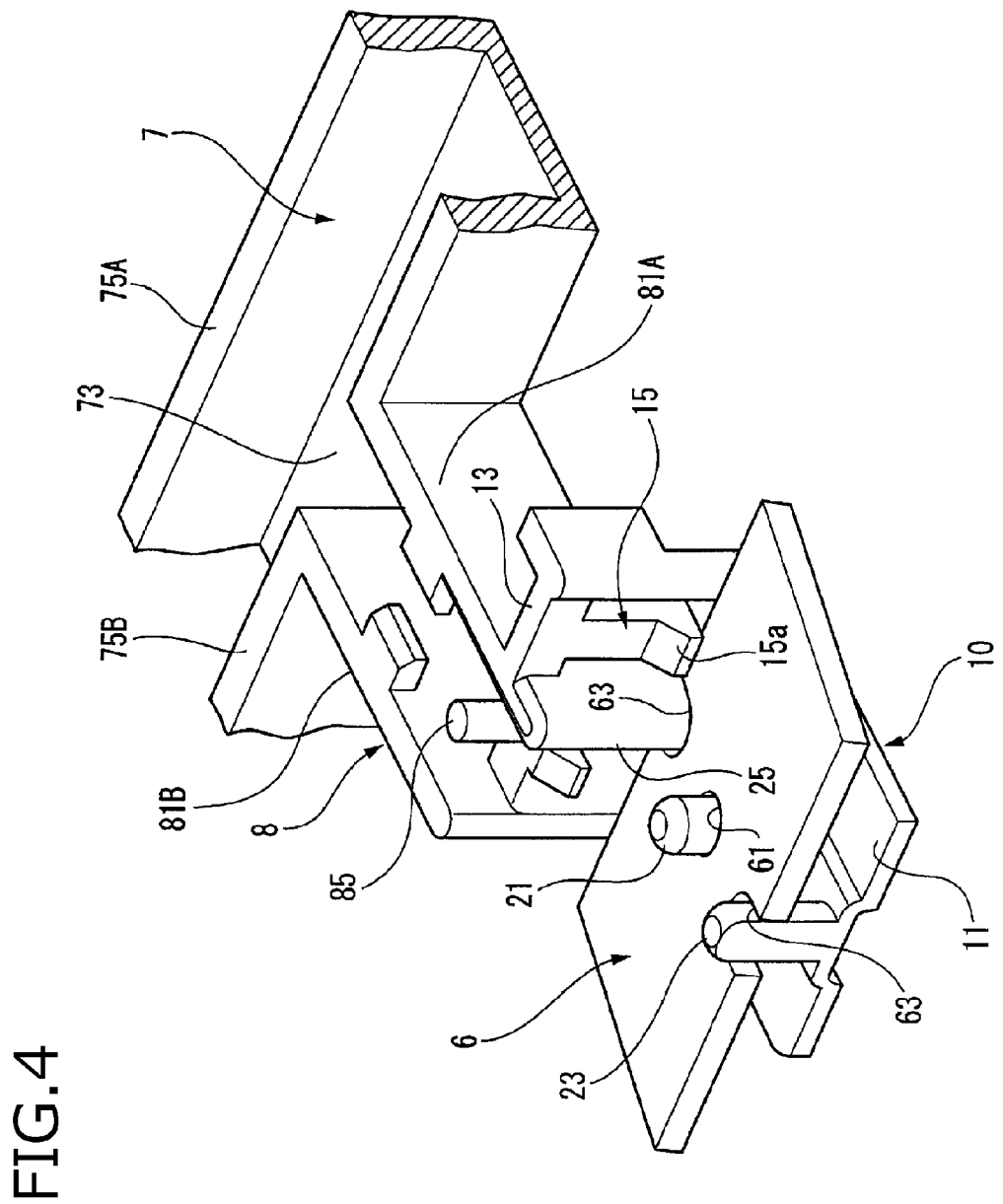
FIG. 4 is a sectional view showing a state of a busbar shown in FIG. 3B.
Figure 5A:
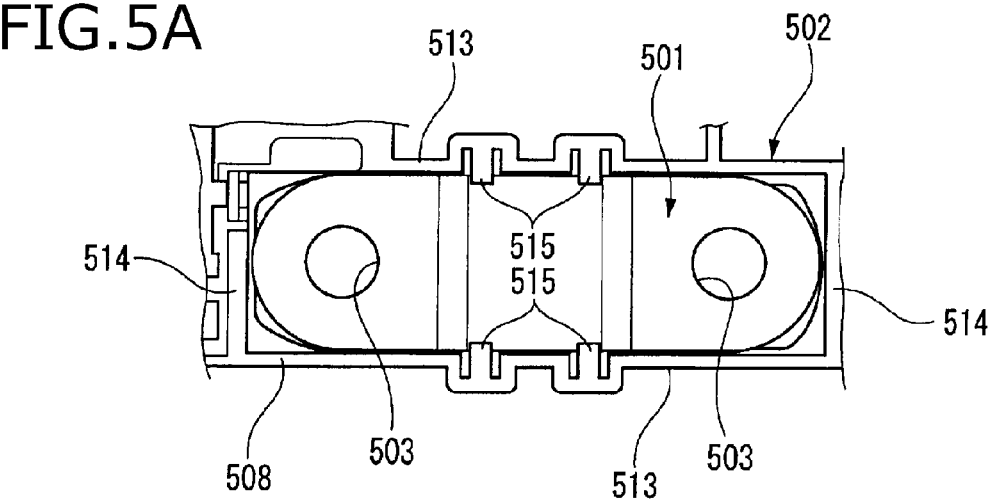
FIG. 5A is a plan view of a conventional busbar and busbar fixing unit.
Figure 5B:
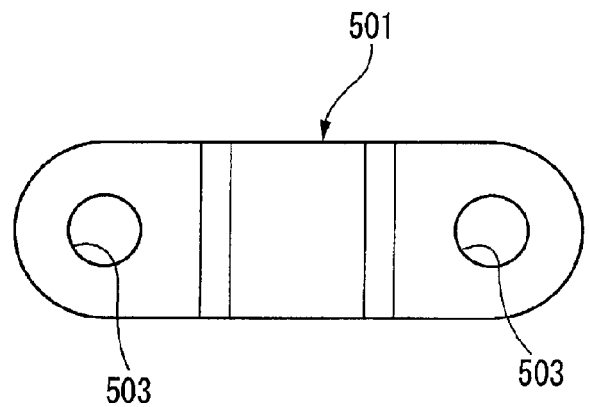
FIG. 5B is a plan view of the busbar shown in FIG. 5A.
Figure 5C:
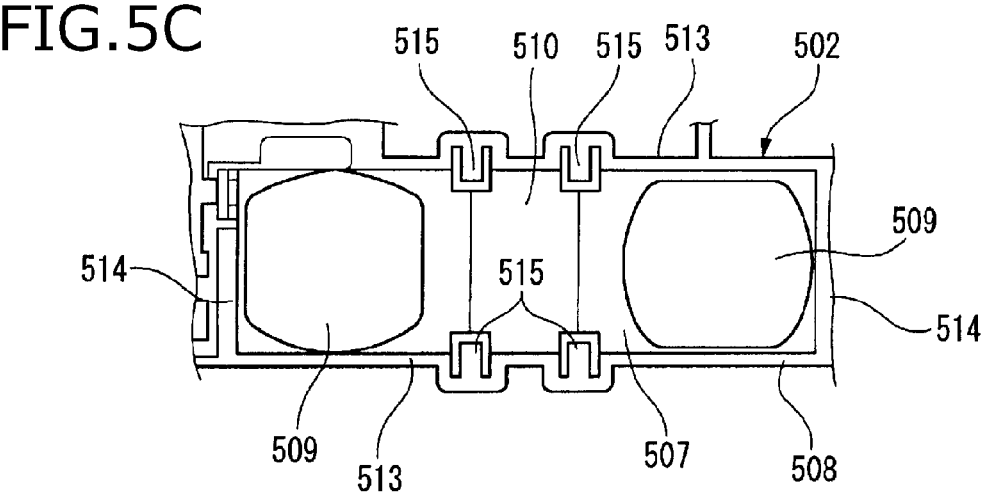
FIG. 5C is a plan view of the busbar fixing unit shown in FIG. 5A.

As shown in FIG. 3B, the fitting gap between the first projection 21 and the through-hole 61 is set so that the side end portion of the busbar 6 is not unlocked from the busbar lock projection 15a by restricting the inclination angle of the busbar 6 with respect to the first projection 21.

More specifically, by properly setting the outer diameter d of the first projection 21 and the inner diameter D of the through-hole 61, the fitting gap between the first projection 21 and the through-hole 61 is determined and the inclination angle of the busbar 6 with respect to the first projection 21 is determined accordingly. Furthermore, by properly setting the height h of the busbar lock projection 15a with respect to the bottom wall 11, a necessary overlap between the busbar lock projection 15a and the side end portion of the busbar 6 is secured when the busbar 6 is inclined. Thus, the busbar 6 does not come off the busbar holding unit 10.

Furthermore, as shown in FIG. 2, the second projection 23 and the third projection 25 which project perpendicularly from the bottom wall 11 so as to be line-symmetrical with each other with respect to a straight line passing through the first projection 21 are engaged with the pair of engagement portions 63, respectively, which are cuts adjacent to the opposite longer edges of the associated busbar 6. The second projection 23 projects perpendicularly from the bottom wall 11 on its tip-side edge, and the third projection 25 projects perpendicularly from the bottom wall 11 on its base-side edge so as to be integral with the partition wall 13. Since the pair of engagement portions 63 of the busbar 6 are engaged with the second projection 23 and the third projection 25, respectively, the rotation of the busbar 6 about the cylindrical first projection 21 is restricted and hence the busbar 6 is positioned reliably.

A voltage detection terminal 9 which is connected to one end of a voltage detection wire W is set in the associated link portion 8 that is continuous with the upper portion of the partition wall 13. A confronting pair of side walls 81A and 81B of the link portion 8 form a housing space for housing a wire connection portion 93 of the voltage detection terminal 9. A temporary holding portion 99, held between the side walls 81A and 81B, of the voltage detection terminal 9 which is set in the link portion 8 is temporarily held by the associated busbar holding unit 10.

Each voltage detection terminal 9 is crank-shaped in cross section, and has an electric connection portion 91 to be welded to the associated busbar 6, the wire connection portion 93 which is connected to the associated voltage detection wire W, and the temporary holding portion 99 which connects the electric connection portion 91 and the wire connection portion 93 and is to be temporarily fixed to the associated busbar holding unit 10.

The electric connection portion 91 is shaped like a rectangular flat plate and is to be welded to the top surface of the busbar 6 by laser welding, for example. The wire connection portion 93 has a conductor crimping portion 94 which is crimped on a core wire portion exposed by peeling off an insulating covering of a terminal portion of the voltage detection wire W and a covering crimping portion 92 which is crimped on the voltage detection wire W via the insulating covering. The temporary holding portion 99 is positioned in such a manner that it is held between the side walls 81A and 81B of the associated link portion 8 and a positioning hole 100 is fitted with the positioning pin 85.

The wires routing portion 7 is composed of a rectangular-plate-like bottom wall 73 and a pair of side walls 75A and 75B which are erected perpendicularly from the two respective edges of the bottom wall 73 that are opposite to each other in the width direction, and is thus like a U-shaped gutter in cross section.

The wires routing portion 7 is disposed on one side of the busbar holding units 10 so as to extend in their arrangement direction, and is connected to the busbar holding units 10 by the respective link portions 8. The wires routing portion 7 forms a routing space for routing, in the cell batteries arrangement direction, the voltage detection wires W which lead out of the respective link portions 8.

The side walls 75A and 75B of the wires routing portion 7 may be formed with wire pressing portions integrally at their top edges, respectively. As a further alternative, the wires routing portion 7 may be covered with a rectangular-plate-like lid so that its top opening is closed. The lid is provided swingably in such a manner that part of one of its two longer side end portions is connected to the one side wall 75A by a hinge.

Each of the voltage detection wires W to be routed in the routing space of the wires routing portion 7 is a covered wire in which a core wire (conductor) is covered with an insulating covering. The wire connection portion 93 of each voltage detection terminal 9 is crimped on one end portion of the associated voltage detection wire W. The other end portion of the voltage detection wire W is connected to a voltage detection circuit (not shown).

The voltage detection wires used in the embodiment are not limited to covered wires as used in the embodiment; each voltage detection wire may be any of various other kinds of electric wires such as one in which a single wire (conductor) is covered with an insulating covering and a flat cable.

As described above, in each busbar holding structure of the busbar module 1 according to the embodiment, as shown in FIG. 3A, the fitting gap between the first projection 21 and the through-hole 61 is set by properly setting the outer diameter d of the first projection 21 which projects perpendicularly from the bottom wall 11 of the busbar holding unit 10 and the inner diameter D of the through-hole 61 of the busbar 6. And the height h of the busbar lock projection 15a of the lock portion 15 with respect to the bottom wall 11 is set properly. Only with these measures, the busbar 6 can be held reliably by the wires routing body 20.

As a result, the wires routing body 20 used in the embodiment does not require any circumferential wall that surrounds each busbar 6 and hence can be miniaturized, which enables reduction in cost and weight. Furthermore, since there exists only one lock portion 15 which produces insertion resistance when the busbar 6 is inserted until coming into contact with the bottom wall 11, the force that is necessary to insert the busbar 6 can be made weaker than in conventional cases.

In each busbar holding structure of the busbar module 1 according to the embodiment, as shown in FIG. 2, the second projection 23 to engage with one of the engagement portions 63 of the associated busbar 6 projects perpendicularly from the bottom wall 11 of the busbar holding unit 10. Thus, rotation of the busbar 6 about the first projection 21 is restricted by the first projection 21 and the second projection 23 which project perpendicularly from the bottom wall 11, whereby the busbar 6 is positioned reliably.

As a result, for example, when the busbar 6 is welded to a positive terminal 4 and a negative terminal 5 by ultrasonic welding, an event can be prevented that the busbar 6 is rotated due to vibration of a horn and a sufficient amount of ultrasonic wave vibration energy does not reach welding portions. In another case that each busbar carries current in a state that it is sandwiched between nuts and unit battery electrode top surfaces, an event can likewise be prevented that the busbar is rotated together with each nut due to rotational torque that is produced when the nut is screwed to the electrode and sufficient fastening force cannot be obtained.

Furthermore, in each busbar holding structure of the busbar module 1 according to the embodiment, the through-hole 61 is formed through the busbar 6 at the center and the longer edges of the busbar 6 are formed with the pair of engagement portions 63 that are line-symmetrical with each other with respect to a straight line passing through the through-hole 61. And the second projection 23 and the third projection 25 project perpendicularly from the bottom wall 11 so as to be line-symmetrical with each other with respect to a straight line passing through the first projection 21.

Thus, when the first projection 21 is inserted into the through-hole 61 of the busbar 6, the pair of engagement portions 63 can engage with the second projection 23 and the third projection 25, respectively. As a result, in letting each busbar 6 held by the wires routing body 20, the attachment direction of the busbar 6 is not restricted and the efficiency of attachment work is thereby increased.

As such, the busbar holding structure according to the embodiment can remove useless portions while ensuring busbar 6 positioning etc. and thereby reduce the size, weight, and manufacturing cost of the busbar module 1.

Now, features of the above-described busbar holding structure according to the embodiment of the invention will be summarized below concisely.

[1] There is provided a busbar holding structure for holding, to a wires routing body (20) made of an insulative resin, at least one busbar of plural busbars (6) for electrically connecting plural cell batteries (3) constituting a battery assembly (2) to each other, the busbar holding structure comprising:

a bottom wall (11) on which the at least one busbar is to be mounted;

a partition wall (13) erected from a portion of a peripheral edge of the bottom wall;

a lock portion (15) provided on the partition wall and configured to lock a side end portion of the at least one busbar on the wires routing body; and a first projection (21) that projects perpendicularly from the bottom wall and is to be fitted in a through-hole (61) provided in the at least one busbar, wherein a fitting gap between the first projection and the through-hole is set so as to restrict an inclination angle of the at least one busbar with respect to the first projection and to thereby prevent the at least one busbar from being unlocked from the lock portion.

[2] The busbar holding structure according to item [1], further includes a second projection (23) that projects perpendicularly from the bottom wall (11) and is to be fitted in an engagement portion (63) provided in the at least one busbar (6).

[3] In the busbar holding structure according to item [2], the through-hole (61) is formed at a center portion of the at least one busbar (6), the engagement portion and another engagement portion are provided at edge portions of the at least one busbar, and the engagement portion and the another engagement portion are arranged so as to be symmetrical with respect to the through-hole.

The invention is not limited the above embodiment, and various modifications, improvements, etc. can be made as appropriate. And the material, shape, dimensions, number (where plural ones are provided), location, etc. of each constituent element of the embodiment are optional and no limitations are imposed on them as long as the invention can be implemented.

For example, although in the embodiment the first projection 21 is circular in cross section and the through-hole 61 is circular, the invention is not limited to this case; they may have any of various other shapes such as a polygon and an ellipse. By employing a first projection that is not circular in cross section and a through-hole having a non-circular shape that conforms to the sectional shape of the first projection, rotation of each busbar can be prevented without using the second projection.

What is claimed is:

1. A busbar holding structure for holding, to a wires routing body made of an insulative resin, at least one busbar of plural busbars for electrically connecting plural cell batteries constituting a battery assembly to each other, the busbar holding structure comprising:

a wires routing portion configured to house a plurality of electric wires;

a bottom wall on which the at least one busbar is mounted;

a partition wall erected from a portion of a peripheral edge of the bottom wall and connected to the wires routing portion;

a lock portion provided on the partition wall and configured to lock a side end portion of the at least one busbar on the wires routing body; and a first projection that projects perpendicularly from the bottom wall and is to be fitted in a through-hole provided in the at least one busbar, wherein a fitting gap between the first projection and the through-hole is set so as to restrict an inclination angle of the at least one busbar with respect to the first projection and to thereby prevent the at least one busbar from being unlocked from the lock portion, and the bottom wall is cantilevered to the partition wall.

2. The busbar holding structure according to claim 1, further comprising:

a second projection that projects perpendicularly from the bottom wall and is to be fitted in an engagement portion provided in the at least one busbar.

3. The busbar holding structure according to claim 2, wherein the through-hole is formed at a center portion of the at least one busbar;

wherein the engagement portion and another engagement portion are provided at edge portions of the at least one busbar; and wherein the engagement portion and the another engagement portion are arranged so as to be symmetrical with respect to the through-hole.

4. The busbar holding structure according to claim 1, wherein the partition wall includes a bottom end and an upper portion, the bottom end is continuous with the portion of the peripheral edge of the bottom wall, and the upper portion is continuous with the wires routing body.

* * * * *